March 27, 1956
H. A. HEIDE
2,739,696
MEANS FOR CONTROLLING POSITION
OF ARTICLES ON CONVEYORS
Filed April 20, 1953
2 Sheets-Sheet 1
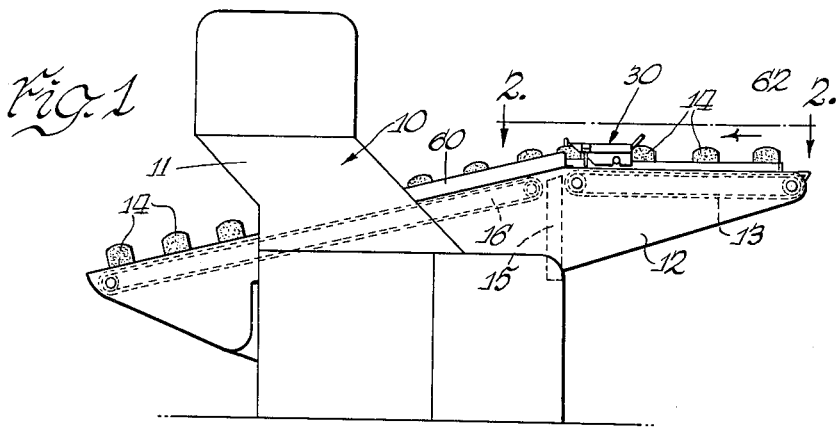
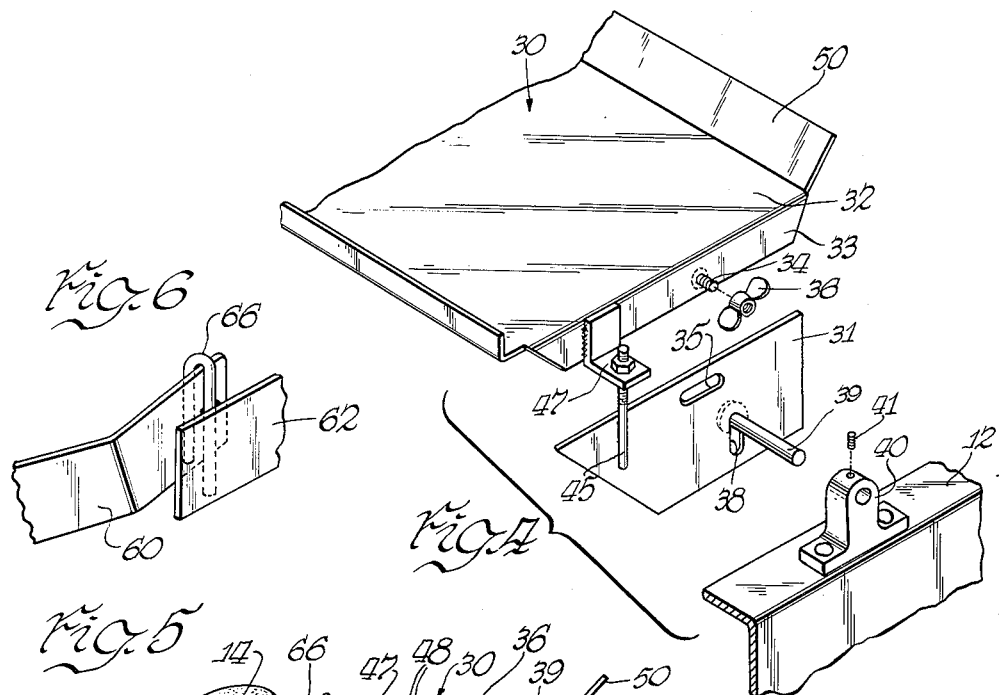
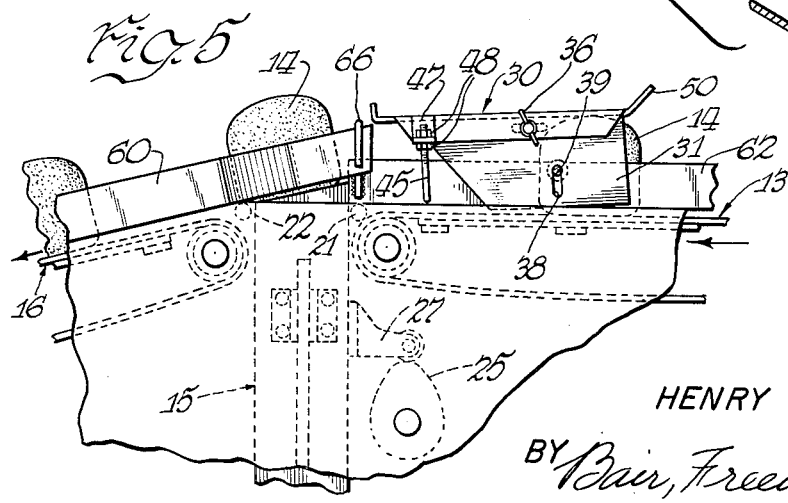
INVENTOR
HENRY ADOLPH HEIDE
BY Bair, Freeman & Molinare
ATTORNEYS

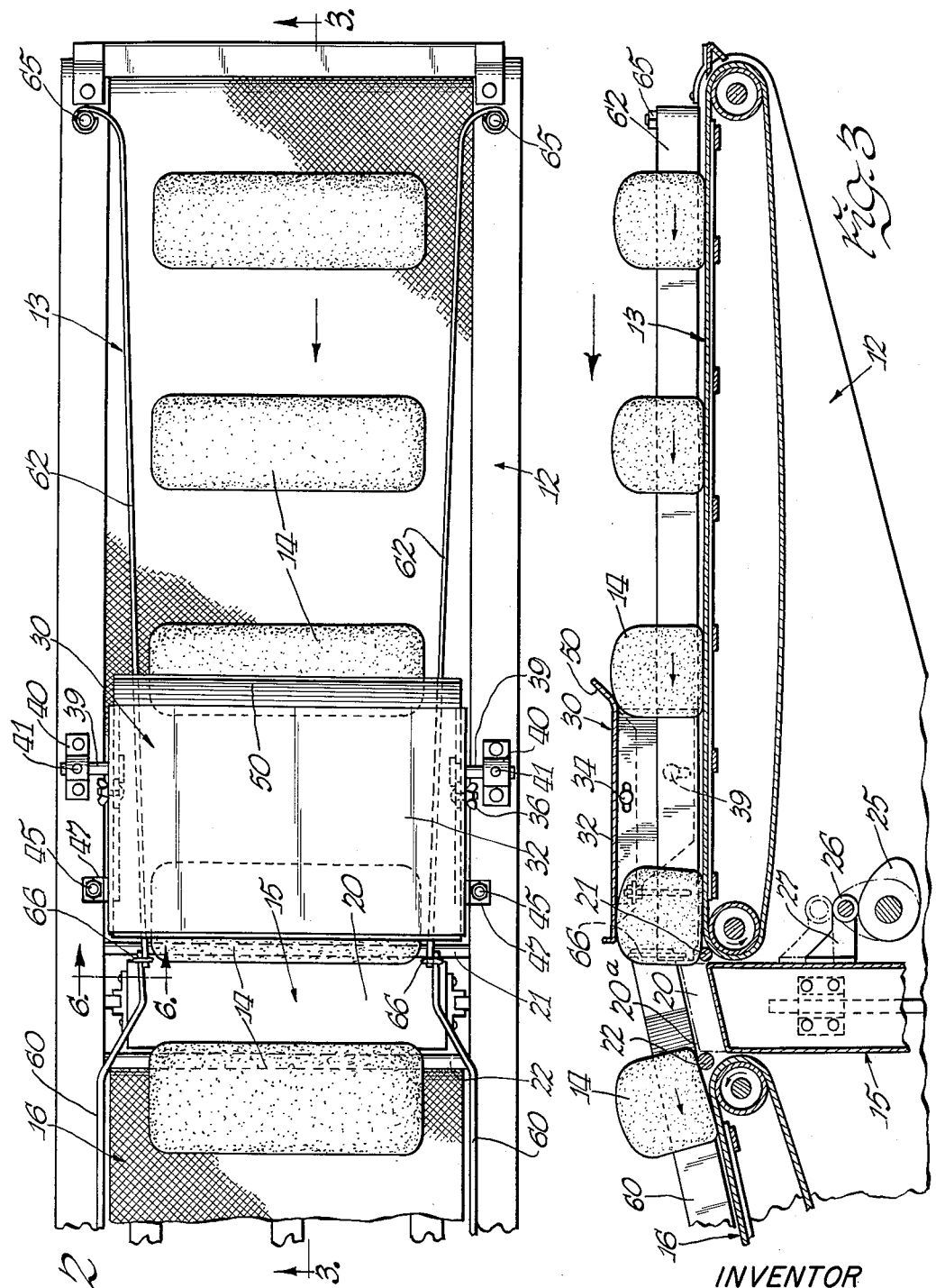

United States Patent Office 2,739,696
Patented Mar. 27, 1956

2,739,696

MEANS FOR CONTROLLING POSITION OF ARTICLES ON CONVEYORS

Henry Adolph Heide, Addison, Ill., assignor to The Petersen Oven Company, Franklin Park, Ill., a corporation of Illinois Application April 20, 1953, Serial No. 349,795

7 Claims. (Cl. 198—34)

This invention relates to mechanical bread handling apparatus of the type employed in commercial bakeries. More particularly, the present invention is directed to apparatus for controlling the position of loaves of bread preparatory to feeding into a bread slicing machine.

In bread producing and handling systems for bakeries, requiring high rates of production, it is customary to employ various automatic equipment for handling and processing of the bread. In such systems it long has been a problem to insure proper positioning and alignment of loaves of bread as they are fed into the slicing machines. In certain bakery installations where production rate requirements are not excessively high, or where the equipment for processing is not of an automatic nature, it is customary to employ an operator, who continuously pushes loaves of bread against others, in a proper upright and aligned position, preparatory to feeding into the slicing machine.

Certain widely used types of slicing machines, employed in commercial bakeries, are provided with a feeding conveyor which receives bread from other conveyors of the system, and which feeding conveyor feeds the loaves of bread onto a vertically reciprocating elevator. The elevator is provided so as to assist in positioning the loaves of bread and feeding said loaves in spaced apart relation onto a receiving conveyor which directly feeds the loaves into the slicing machine. When slicers of this type are employed in a complete automatic bread handling system, it is not possible to maintain proper timed feeding relation of the loaves of bread onto the feeding conveyor with respect to the operation of the elevator. Hence, it frequently happens that a loaf of bread is engaged by the elevator in a manner to cause it to roll over and further, sometimes becomes misaligned. When loaves of bread are not fed in an upright position, in aligned relation into the slicing machine, it frequently happens that loaves of bread become misaligned in the process of feeding directly into the slicer. Such a condition may cause jamming of the slicer, as well as presenting other problems in connection with the automatic machine for wrapping of bread.

One of the primary objects of the present invention is to provide novel apparatus for an automatic bread handling system, for controlling the positioning and alignment of loaves of bread preparatory to feeding into the slicing machine.

Another object of this invention is to provide a novel control apparatus of the character indicated which automatically insures control of position and alignment of the loaf of bread preparatory to feeding into the slicing machine.

A further object is to provide novel control apparatus of the character indicated which is simple in construction, positive in operation, and which is capable of quick and easy adjustment for accommodation of loaves of bread of different cross-sectional dimensions.

Other objects and advantages of this invention will be apparent from the following description, taken in connection with the accompanying drawings in which:

Figure 1 is a diagrammatic side elevational view of a bread slicing machine provided with control apparatus embodying the present invention.

Figure 2 is a top plane view of the feeding conveyor and elevator of the slicing machine, provided with my novel control apparatus.

Figure 3 is a longitudinal sectional view, taken as indicated on line 3—3 on Figure 2.

Figure 4 is a perspective view, in disassembled relation, of my novel control apparatus.

Figure 5 is a side elevational view of the feeding conveyor and elevator provided with my novel control apparatus.

Figure 6 is a fragmentary perspective view, of the guide rails on the conveyors, taken substantially as indicated on line 6—6 on Figure 2.

A conventional type of bread slicing machine, which is diagrammatically illustrated in Figure 1, is indicated generally at 10, provided with customary bread slicing elements (not shown) within a housing 11, and which elements and housing form no part of the present invention. Extending rearwardly from the machine is a frame structure 12, in which is mounted a feeding conveyor 13 which feeds loaves of bread, as indicated at 14, to a vertically reciprocating elevator 15. The elevator is positioned to receive the loaves of bread from the discharge end of the conveyor 13, and raise them to a position for discharging onto a receiving conveyor, indicated generally at 16. This latter conveyor feeds the loaves of bread 14 directly into the cutting elements of the slicing machine, after which the sliced loaves of bread, as indicated at the left-hand portion of Figure 1 of the drawings, are conveyed to a suitable wrapping machine, not shown.

As may be seen in the drawings, the feeding conveyor 13 includes a continuously traveling belt, driven in any suitable manner, not shown. Located immediately adjacent the discharge end of the feeding conveyor 13, is the vertically reciprocating elevator 15, the upper end of which is provided with a platform 20, inclined downwardly away from the feeding conveyor 13. As seen in Figure 3 of the drawings, the elevator with its platform is shown in full lines, at its lowermost position of its cycle of operation, for receiving onto the platform a loaf of bread from the discharge end of the conveyor 13. To facilitate feeding of the loaves of bread off of the discharge end of the feeding conveyor 13, onto the platform of the elevator, a live or power-driven roller 21 is mounted immediately adjacent the discharge end of the conveyor. When a loaf of bread is properly positioned on the platform of the elevator, and the elevator is raised with its platform at the dot and dash position, indicated at 20a in Figure 3 of the drawings, said loaf of bread, due to the inclination of the platform, slides off of the platform onto a live roller 22, and thence onto the conveyor 16, for direct feeding into the slicing machine proper. The live rollers 21 and 22 may be understood to be suitably driven by the respective conveyors 13 and 16.

The elevator is vertically reciprocated in any convenient manner, and as shown diagrammatically, by a power-driven rotary cam 25, engaging a roller 26, carried on a follower arm 27, attached directly to the elevator 15. It is to be understood that the upper end of the elevator, when in raised position, above the discharge end of conveyor 13, serves as a stop for the next adjacent loaf of bread on said feeding conveyor 13, because it is not possible to maintain exact timed correlation of feeding of the loaves of bread on the conveyor 13 with respect to the reciprocation of the elevator 15.

It frequently happens that a loaf of bread as it feeds off of the discharge end of the feeding conveyor 13, is only partially extended over the platform 20 of the elevator when the latter is in process of raising, which causes the loaf of bread to tilt and roll over and become misaligned. Such a condition, as above indicated, presents serious problems in both the slicing machine proper, as well as in the bread wrapping machine from which the loaves of sliced bread are fed.

The control apparatus embodying the present invention is located adjacent the discharge end of the feeding conveyor 13 and serves to control the position and alignment of the loaves of bread, so as to insure that when they are fully and properly engaged by the platform of the elevator, they are in a correct position as well as in alignment. The elevator serves to effect proper spacing of the loaves of bread as they are discharged onto the conveyor 16, so that the loaves are fed in proper correlation to the operation of the slicing elements of the slicing machine proper.

The control apparatus comprises an inverted U-shaped body, indicated generally at 30. Said body is positioned in straddling relation to the discharge end of the feeding conveyor 13, as clearly seen in the drawings. Said body includes a pair of spaced apart, depending leg portions 31, and an intermediate portion 32. The intermediate portion 32 at its opposite sides, is formed with depending flanges 33, from which extend in opposite outwardly directions threaded studs 34. The leg portions 31 are seated against the respective flanges 33 of the intermediate portion 32, with the studs 34 extending through an elongated slot 35 formed in the upper portion of each of the leg portions or members 31, and the parts are secured in assembled relation by wing nuts 36. The purpose of the slots 35 is to permit longitudinal adjustment of the intermediate portion 32 of the body with respect to the leg portions thereof, for accommodating loaves of bread of different widths. The lower portion of each of the leg portions 31, is provided with a vertically extending elongated slot 38, in which is mounted a headed, horizontally extending pivot pin or stud 39, as clearly seen in Figure 4 of the drawings. The studs are mounted in blocks 40, carried on the frame 12, at opposite sides of the feeding conveyor, and are firmly held in position by set screws 41. The pivot pins 39, at each side of the body thus serve as the support and fulcrum for the entire body and said pins 39 and slots 38 are so related to the leg portions and intermediate portion of the body that the forward portion of the body serves as a counterweight and tends to tilt in a downward direction to a position as seen in Figure 5 of the drawings, at which position the pivot pins 39 tend to seat in the upper end of the slots 38 in the leg portions. As a loaf of bread on the conveyor 13 feeds beneath the body 30, it engages the underside of the intermediate portion 32 and tends to raise the body slightly so that the body exerts a slight amount of friction or load on the loaves of bread, which assists in maintaining them in proper upright position, during their passage throughout the length of the body. In the event that a loaf of bread, as it feeds off of the discharge end of the feeding conveyor 13, is not fully seated upon the platform 20 of the elevator, and the elevator commences to raise, the tendency for the loaf of bread to tilt or roll rearwardly is prevented by the weight or slight pressure of the body 30, upon the top of the loaf, and hence, the elevator may continue to reciprocate and during its next upstroke will be in a position to pick up and properly support the loaf of bread on its platform 20, for discharging onto the conveyor 16.

In order to limit the extent of tilting of the forward end of the body 30, I provide suitable stop means at each side, in the form of rods 45, the lower ends of which are adapted to engage the frame 12 of the conveyor 13. The upper end of the rods are threaded and are secured in clips 47 carried on the flanges 33 of the intermediate portion of the body. A pair of nuts 48 are mounted on the threaded portion of each rod 45, at opposite sides of the leg of the clip. By virtue of this construction, said stop members 45 may be adjusted vertically with respect to the body so that the body may be limited to a desired position of tilting for accommodating loaves of bread of varying heights.

By virtue of the construction described, it will be apparent that as the forward end of the body is raised by the combined action of the loaf of bread and the elevator, the entire body accommodates such movement by reason of its being capable of vertical movement incident to the lost motion connection provided by the slots 38, with respect to the studs 39. By virtue of this construction, it will not be possible, when the body pivots incident to raising of the forward end, to cause the rear end to drop down and function as a block or stop for the oncoming loaves of bread on the feeding conveyor.

The rear edge of the intermediate portion 32 of the body, is bent to provide an upward and obliquely extending flange 50, so as to facilitate the feeding of loaves of bread beneath the body. Said flange serves as a guide to gradually raise the body as the loaf of bread feeds thereunder.

By virtue of the present invention it is possible, in a completely automatic bread handling system for commercial bakeries, to properly feed bread to the slicing machines in a manner to substantially preclude possible rollover of loaves, misalignment, or injury to the loaves of bread.

Mounted on the receiving conveyor 16, is a pair of guide rails 60, located adjacent the side edges of the belt of the conveyor. The rear ends of these guide rails, as may be seen in Figure 2 of these drawings, are inwardly offset and terminate immediately above the elevator 15. Mounted on the feeding conveyor 13 are a pair of transversely spaced apart, longitudinally extending guide rails 62, which extend directly over the belt of the conveyor 13, and serve to position the loaves of bread 14 in proper endwise relation on the conveyor preparatory to feeding onto the platform 20 of the elevator. These guide rails 62 are each pivotally mounted on their rear ends on a vertical bolt 65, secured to the frame 12 of the feeding conveyor. The forward ends of the rails 62 are provided with a modified, inverted U-shaped rod 66, having one leg secured to the outer side of the guide rail 62, and straddling the terminal end of an aligned guide rail 60, of the conveyor 16, as seen in the drawings. The purpose of this interconnection of the guide rails of the two conveyors 13 and 16 is so that when the guide rails 60 on the conveyor 16 are adjusted to a desired spaced apart relation, the movement of their rear ends automatically effect proper adjustment or spacing of the guide rail 62 on the feeding conveyor 13.

Although I have herein shown and described a preferred embodiment of my invention, manifestly it is capable of modification and rearrangement of parts without departing from the spirit and scope thereof. I do not, therefore, wish to be understood as limiting this invention to the precise embodiment herein disclosed, except as I may be so limited by the appended claims.

It is claimed:

1. For use with a bread slicing machine comprising a feeding conveyor for delivering loaves of bread in spaced apart relation, a supporting frame for the conveyor, and a vertically reciprocating elevator positioned immediately adjacent the discharge end of said conveyor, said elevator having a platform adapted in one position of its cycle of operation to receive a loaf of bread fed from the discharge end of the conveyor and adapted in another position of its cycle of operation to be elevated to raise said loaf of bread to a position for discharge onto a receiving conveyor for conveying the bread directly into the slicing machine, said elevator, when in raised position, serving as a stop to arrest movement of the next adjacent loaf on the conveyor; apparatus for controlling the position of loaves of bread as they are fed onto and engaged by the platform of the elevator, said apparatus comprising an inverted U-shaped body carried on said frame and straddling said feeding conveyor adjacent the discharge end, said body having depending leg portions and an intermediate portion connected to said legs, and means for pivotally mounting the body on said frame to dispose the body at a height whereby loaves of bread passing on the conveyor engage the underside of the intermediate portion of said body, said pivotal mounting being constructed and arranged for permitting vertical movement of the body relatively to the frame.

2. For use with a bread slicing machine comprising a feeding conveyor for delivering loaves of bread in spaced apart relation, a supporting frame for the conveyor, and a vertically reciprocating elevator positioned immediately adjacent the discharge end of said conveyor, said elevator having a platform adapted in one position of its cycle of operation to receive a loaf of bread fed from the discharge end of the conveyor and adapted in another position of its cycle of operation to be elevated to raise said loaf of bread to a position for discharge onto a receiving conveyor for conveying the bread directly into the slicing machine, said elevator, when in raised position, serving as a stop to arrest movement of the next adjacent loaf on the conveyor; apparatus for controlling the position of loaves of bread as they are fed onto and engaged by the platform of the elevator, said apparatus comprising an inverted U-shaped body carried on said frame and straddling said feeding conveyor adjacent the discharge end, said body having depending leg portions and an intermediate portion connected to said legs, means for pivotally mounting said legs on the frame at a position whereby the forward end of the body is counterbalanced and tends to tip downwardly, said body being disposed at a height whereby loaves of bread passing on the conveyor engage the underside of said intermediate portion of the body, and means for limiting the downward tilting movement of the forward end of said body.

3. For use with a bread slicing machine comprising a feeding conveyor for delivering loaves of bread in spaced apart relation, a supporting frame for the conveyor, and a vertically reciprocating elevator positioned immediately adjacent the discharge end of said conveyor, said elevator having a platform adapted in one position of its cycle of operation to receive a loaf of bread fed from the discharge end of the conveyor and adapted in another position of its cycle of operation to be elevated to raise said loaf of bread to a position for discharge onto a receiving conveyor for conveying the bread directly into the slicing machine, said elevator, when in raised position, serving as a stop to arrest movement of the next adjacent loaf on the conveyor; apparatus for controlling the position of loaves of bread as they are fed onto and engaged by the platform of the elevator, said apparatus comprising an inverted U-shaped body carried on said frame and straddling said feeding conveyor adjacent the discharge end, said body having depending leg portions and an intermediate portion connected to said legs, means for pivotally mounting said legs on the frame at a position whereby the forward end of the body is counterbalanced and tends to tip downwardly, said body being disposed at a height whereby loaves of bread passing on the conveyor engage the underside of said intermediate portion of the body, said pivotal mounting being constructed and arranged for permitting vertical movement of the body relative to the frame, and means for limiting the downward tilting movement of the forward end of said body, said last mentioned means being adjustable to vary the downward tilted position of said body for accommodating loaves of different heights.

4. For use with a bread slicing machine comprising a feeding conveyor for delivering loaves of bread in spaced apart relation, a supporting frame for the conveyor, and a vertically reciprocating elevator positioned immediately adjacent the discharge end of said conveyor, said elevator having a platform adapted in one position of its cycle of operation to receive a loaf of bread fed from the discharge end of the conveyor and adapted in another position of its cycle of operation to be elevated to raise said loaf of bread to a position for discharge onto a receiving conveyor for conveying the bread directly into the slicing machine, said elevator, when in raised position, serving as a stop to arrest movement of the next adjacent loaf on the conveyor; apparatus for controlling the position of loaves of bread as they are fed onto and engaged by the platform of the elevator, said apparatus comprising an inverted U-shaped body carried on said frame and straddling said feeding conveyor adjacent the discharge end, said body having depending leg portions and an intermediate portion connected to said legs, means for pivotally mounting said legs on the frame at a position whereby the forward end of the body is counterbalanced and tends to tip downwardly, said body being disposed at a height whereby loaves of bread passing on the conveyor engage the underside of said intermediate portion of the body, and means for limiting the downward tilting movement of the forward end of said body, said last mentioned means being adjustable to vary the downward tilted position of said body for accommodating loaves of different heights.

5. For use with a bread slicing machine comprising a feeding conveyor for delivering loaves of bread in spaced apart relation, a supporting frame for the conveyor, and a vertically reciprocating elevator positioned immediately adjacent the discharge end of said conveyor, said elevator having a platform adapted in one position of its cycle of operation to receive a loaf of bread fed from the discharge end of the conveyor and adapted in another position of its cycle of operation to be elevated to raise said loaf of bread to a position for discharge onto a receiving conveyor for conveying the bread directly into the slicing machine, said elevator, when in raised position, serving as a stop to arrest movement of the next adjacent loaf on the conveyor; apparatus for controlling the position of loaves of bread as they are fed onto and engaged by the platform of the elevator, said apparatus comprising an inverted U-shaped body carried on said frame and straddling said feeding conveyor adjacent the discharge end, said body having depending leg portions and an intermediate portion connected to said legs, means for pivotally mounting said legs on the frame at a position whereby the forward end of the body is counterbalanced and tends to tip downwardly, said body being disposed at a height whereby loaves of bread passing on the conveyor engage the underside of said intermediate portion of the body, and means detachably interconnecting said leg portions and intermediate portion for longitudinally adjusting said intermediate portion relative to said leg portions.

6. For use with a bread slicing machine comprising a feeding conveyor for delivering loaves of bread in spaced apart relation, a supporting frame for the conveyor, and a vertically reciprocating elevator positioned immediately adjacent the discharge end of said conveyor, said elevator having a platform adapted in one position of its cycle of operation to receive a loaf of bread fed from the discharge end of the conveyor and adapted in another position of its cycle of operation to be elevated to raise said loaf of bread to a position for discharge onto a receiving conveyor for conveying the bread directly into the slicing machine, said elevator, when in raised position, serving as a stop to arrest movement of the next adjacent loaf on the conveyor; apparatus for controlling the position of loaves of bread as they are fed onto and engaged by the platform of the elevator, said apparatus comprising an inverted U-shaped body carried on said frame and straddling said feeding conveyor adjacent the discharge end, said body having depending leg portions and an intermediate portion connected to said legs, and means for pivotally mounting said legs on the frame at a position whereby the forward end of the body is counterbalanced and tends to tip downwardly, said body being disposed at a height whereby loaves of bread passing on the conveyor engage the underside of said intermediate portion of the body, said pivotal mounting means comprising horizontally extending studs carried on the frame and extending through upwardly extending elongated slots in the respective leg portions.

7. For use with a bread slicing machine comprising a feeding conveyor for delivering loaves of bread in spaced apart relation, a supporting frame for the conveyor, and a vertically reciprocating elevator positioned immediately adjacent the discharge end of said conveyor, said elevator having a platform adapted in one position of its cycle of operation to receive a loaf of bread fed from the discharge end of the conveyor and adapted in another position of its cycle of operation to be elevated to raise said loaf of bread to a position for discharge onto a receiving conveyor for conveying the bread directly into the slicing machine, said elevator, when in raised position, serving as a stop to arrest movement of the next adjacent loaf on the conveyor; apparatus for controlling the position of loaves of bread as they are fed onto and engaged by the platform of the elevator, said apparatus comprising an inverted U-shaped body carried on said frame and straddling said feeding conveyor adjacent the discharge end, said body having depending leg portions and an intermediate portion connected to said legs, means for pivotally mounting said legs on the frame at a position whereby the forward end of the body is counterbalanced and tends to tip downwardly, said body being disposed at a height whereby loaves of bread passing on the conveyor engage the underside of said intermediate portion of the body, a pair of spaced apart, longitudinally extending guide rails disposed above the conveyor and extending between said leg portions of said body, and means for pivotally mounting the rear ends of said rails on said frame, whereby the forward ends of said rails may be moved toward and away from each other.

References Cited in the file of this patent

UNITED STATES PATENTS

| | | |
|---|---|---|
| 2,437,124 | Petskeyes | Mar. 24, 1948 |
| 2,587,496 | Manteria | Feb. 26, 1952 |